United States Patent
Himes et al.

(10) Patent No.: US 10,989,054 B2
(45) Date of Patent: Apr. 27, 2021

(54) ROTATING COMPONENT BALANCE RING

(71) Applicant: United Technologies Corporation, Hartford, CT (US)

(72) Inventors: Jason D. Himes, Tolland, CT (US); Peter Josef Karner, Glastonbury, CT (US)

(73) Assignee: Raytheon Technologies Corporation, Farmington, CT (US)

(*) Notice: Subject to any disclaimer, the term of this patent is extended or adjusted under 35 U.S.C. 154(b) by 1293 days.

(21) Appl. No.: 15/023,831

(22) PCT Filed: Sep. 25, 2014

(86) PCT No.: PCT/US2014/057346
§ 371 (c)(1),
(2) Date: Mar. 22, 2016

(87) PCT Pub. No.: WO2015/088620
PCT Pub. Date: Jun. 18, 2015

(65) Prior Publication Data
US 2016/0237824 A1    Aug. 18, 2016

Related U.S. Application Data

(60) Provisional application No. 61/882,673, filed on Sep. 26, 2013.

(51) Int. Cl.
| | |
|---|---|
| *F01D 5/02* | (2006.01) |
| *F16F 15/32* | (2006.01) |
| *F16F 15/34* | (2006.01) |
| *F02C 3/04* | (2006.01) |
| *F04D 29/32* | (2006.01) |

(Continued)

(52) U.S. Cl.
CPC ............. *F01D 5/027* (2013.01); *F02C 3/04* (2013.01); *F04D 29/321* (2013.01); *F04D 29/644* (2013.01); *F04D 29/662* (2013.01); *F16F 15/322* (2013.01); *F16F 15/34* (2013.01); *F05D 2220/32* (2013.01); *F05D 2230/10* (2013.01); *F05D 2230/60* (2013.01)

(58) Field of Classification Search
CPC ...... F01D 5/027; F04D 29/321; F04D 29/662; F04D 29/644; F02C 3/04; F16F 15/34; F16F 15/322; F05D 2230/10; F05D 2220/32; F05D 2230/60
See application file for complete search history.

(56) References Cited

U.S. PATENT DOCUMENTS

| | | |
|---|---|---|
| 4,003,265 A | 1/1977 | Craig et al. |
| 4,294,135 A | 10/1981 | Tameo |
| 4,784,012 A | 11/1988 | Marra |

(Continued)

OTHER PUBLICATIONS

International Search Report and Written Opinion for Application No. PCT/US2014/057346 dated Jun. 29, 2015.

(Continued)

*Primary Examiner* — Eldon T Brockman
(74) *Attorney, Agent, or Firm* — Carlson, Gaskey & Olds, P.C.

(57) ABSTRACT

A balance ring for a gas turbine engine has a ring shaped body with a first radial thickness, an anti-rotation tab extending outward from the body and at least one millable balancing feature connected to the body.

4 Claims, 5 Drawing Sheets

(51) Int. Cl.
*F04D 29/64* (2006.01)
*F04D 29/66* (2006.01)

(56) References Cited

U.S. PATENT DOCUMENTS

| | | | |
|---|---|---|---|
| 4,835,827 A | 6/1989 | Marra | |
| 5,086,590 A * | 2/1992 | Athanasiou | B24B 49/00 |
| | | | 408/11 |
| 5,582,077 A | 12/1996 | Agram et al. | |
| 6,354,780 B1 | 3/2002 | Davis et al. | |
| 6,588,298 B2 | 7/2003 | Czerniak et al. | |
| 7,069,654 B2 | 7/2006 | Robbins | |
| 7,296,976 B2 * | 11/2007 | Roever | F01D 5/027 |
| | | | 416/144 |
| 7,553,125 B2 | 6/2009 | Audic et al. | |
| 8,122,785 B2 | 2/2012 | Czerniak et al. | |
| 8,303,255 B2 * | 11/2012 | Ramlogan | G01M 1/36 |
| | | | 416/144 |
| 8,342,804 B2 | 1/2013 | Pronovost et al. | |
| 2002/0134191 A1 * | 9/2002 | Czerniak | F01D 5/027 |
| | | | 416/145 |
| 2003/0213334 A1 | 11/2003 | Czerniak et al. | |
| 2004/0168291 A1 * | 9/2004 | Robbins | F01D 5/027 |
| | | | 29/406 |
| 2006/0083619 A1 | 4/2006 | Roever et al. | |
| 2006/0272407 A1 * | 12/2006 | Audic | G01M 1/34 |
| | | | 73/460 |
| 2009/0107237 A1 | 4/2009 | Ramlogan et al. | |
| 2010/0080705 A1 * | 4/2010 | Pronovost | F01D 5/027 |
| | | | 416/144 |

OTHER PUBLICATIONS

International Preliminary Report on Patentability for Application No. PCT/US2014/057346 dated Apr. 7, 2016.
Supplementary European Search Report for Application No. 14869043.1 dated Apr. 26, 2017.

* cited by examiner

ROTATING COMPONENT BALANCE RING

CROSS-REFERENCE TO RELATED APPLICATION

This application claims priority to U.S. Provisional Application No. 61/882,673 filed Sep. 26, 2013.

STATEMENT REGARDING GOVERNMENT SUPPORT

This invention was made with government support under Contract No. FA8650-09-D-2923 awarded by the United States Air Force. The Government has certain rights in this invention.

TECHNICAL FIELD

The present disclosure relates generally to rotating components in a turbine engine, and more specifically to a balance ring for circumferentially balancing the rotating components.

BACKGROUND OF THE INVENTION

Gas powered turbines, such as those used to generate thrust in an aircraft turbine engine, typically include a fan, compressor, combustor, and turbine arranged to generate thrust in a known manner. Within the compressor and the turbine are multiple rotating components, such as rotors. Due to variances in the engine designs, the need to accommodate other non-rotating components, and manufacturing variances from engine to engine, the rotating components are not always circumferentially balanced.

Circumferential imbalance in the rotating components can introduce wear on the rotating component and/or the static components adjacent to the rotating component in the gas powered turbine engine. The additional wear and stresses as a result of the circumferential imbalance can reduce the expected lifetime of the rotating component and potentially the expected lifetime of the engine itself.

SUMMARY OF THE INVENTION

A balance ring according to an exemplary embodiment of this disclosure, among other possible things includes a ring-shaped body having a first radial thickness, an anti-rotation tab extending outward from the ring-shaped body, and at least one millable balancing feature connected to the ring-shaped body.

In a further embodiment of the foregoing balance ring, the anti-rotation tab is circumferentially offset from the opening.

In a further embodiment of the foregoing balance ring, the anti-rotation tab circumferential offset is approximately 180°.

In a further embodiment of the foregoing balance ring, the at least one balancing feature includes two balancing features spaced equidistant from the opening.

In a further embodiment of the foregoing balance ring, the at least one balancing feature is integrally connected to the ring-shaped body.

In a further embodiment of the foregoing balance ring, the at least one balancing feature, the ring-shaped body, and the anti-rotation tab are a single monolithic body.

In a further embodiment of the foregoing balance ring, the at least one balancing feature is milled to a counterweight profile operable to circumferentially balance a rotating component.

In a further embodiment of the foregoing balance ring, the anti-rotation tab extends radially outward from the ring-shaped body.

In a further embodiment of the foregoing balance ring, the anti-rotation tab extends axially outward from said ring-shaped body.

A further embodiment of the foregoing balance ring, includes an opening in said ring-shaped body.

A gas turbine engine according to an exemplary embodiment of this disclosure, among other possible things includes a compressor section, a combustor fluidly connected to the compressor section, a turbine section fluidly connected to the combustor section, a rotating engine component positioned in one of the compressor section and the turbine section, and at least one balance ring connected to the rotating engine component, the balance ring comprising a ring-shaped body having a first radial thickness, an anti-rotation tab extending outward from the ring-shaped body, and at least one millable balancing feature connected to the ring-shaped body.

In a further embodiment of the foregoing gas turbine engine, the rotating engine component is a rotor in one of the compressor section and the turbine section.

A further embodiment of the foregoing gas turbine engine, includes at least two balance rings connected to the rotating engine component, each of the at least two balancing rings comprises a unique weight profile operable to counter at least one overweight region.

In a further embodiment of the foregoing gas turbine engine, the anti-rotation tab interfaces with the rotating component such that the balance ring maintains a static position relative to the rotating component.

In a further embodiment of the foregoing gas turbine engine, the rotating component further includes a plurality of anti-rotation slots disposed circumferentially about the rotating component, and each of the anti-rotation slots is operable to receive the anti-rotation tab.

In a further embodiment of the foregoing gas turbine engine, the anti-rotation slots are disposed evenly circumferentially about the rotating component.

In a further embodiment of the foregoing gas turbine engine, the rotating component includes at least a first overweight region having a first weight profile.

In a further embodiment of the foregoing gas turbine engine, at least one balancing feature is milled to a second weight profile operable to counteract the first weight profile and circumferentially balance the rotating component.

A method for balancing a rotating component of a turbine engine according to an exemplary embodiment of this disclosure, among other possible things includes milling at least one balance ring counterweight of a balance ring to a desired weight profile, the desired weight profile counteracts an overweight region of a rotating component, and connecting the balance ring to the rotating component such that the balance ring is maintained in a static position relative to the rotating component.

In a further embodiment of the foregoing method, the step of connecting the balance ring to the rotating component such that the balance ring is maintained in a static position relative to the rotating component comprises receiving an anti-rotation tab of the balance ring in an anti-rotation slot of the rotating component.

In a further embodiment of the foregoing method, further including the step of receiving a ring-shaped body of the balance ring in a balance ring retention groove of the rotating component.

In a further embodiment of the foregoing method, determining a weight profile of the overweight region of said rotating component, and determining a weight profile of the at least one balance ring counterweight operable to counter the overweight region of the rotating component based on the weight profile of the overweight region.

The foregoing features and elements may be combined in any combination without exclusivity, unless expressly indicated otherwise.

BRIEF DESCRIPTION OF THE DRAWINGS

These and other features of the present invention can be best understood from the following specification and drawings, the following of which is a brief description.

DETAILED DESCRIPTION

Figure 1:
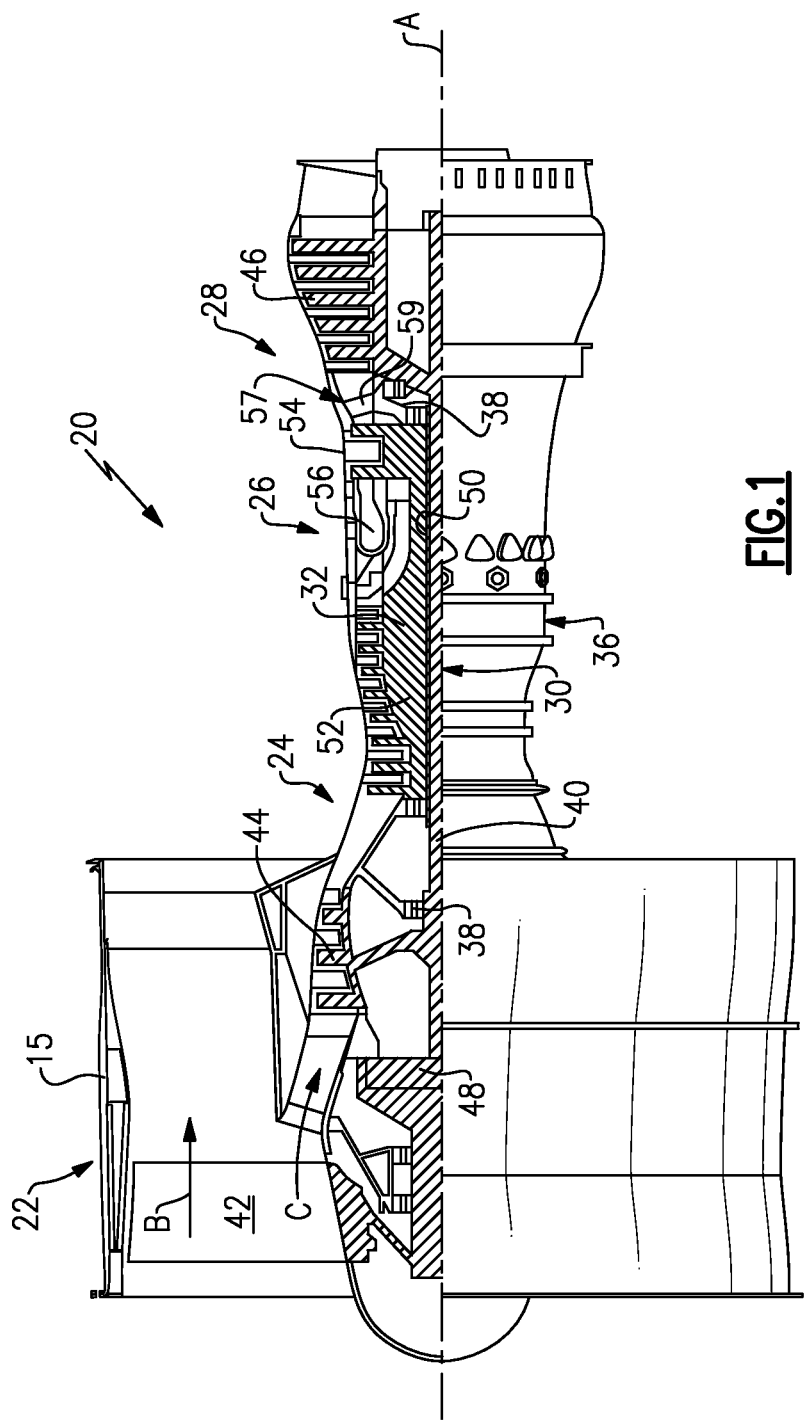
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28.

The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
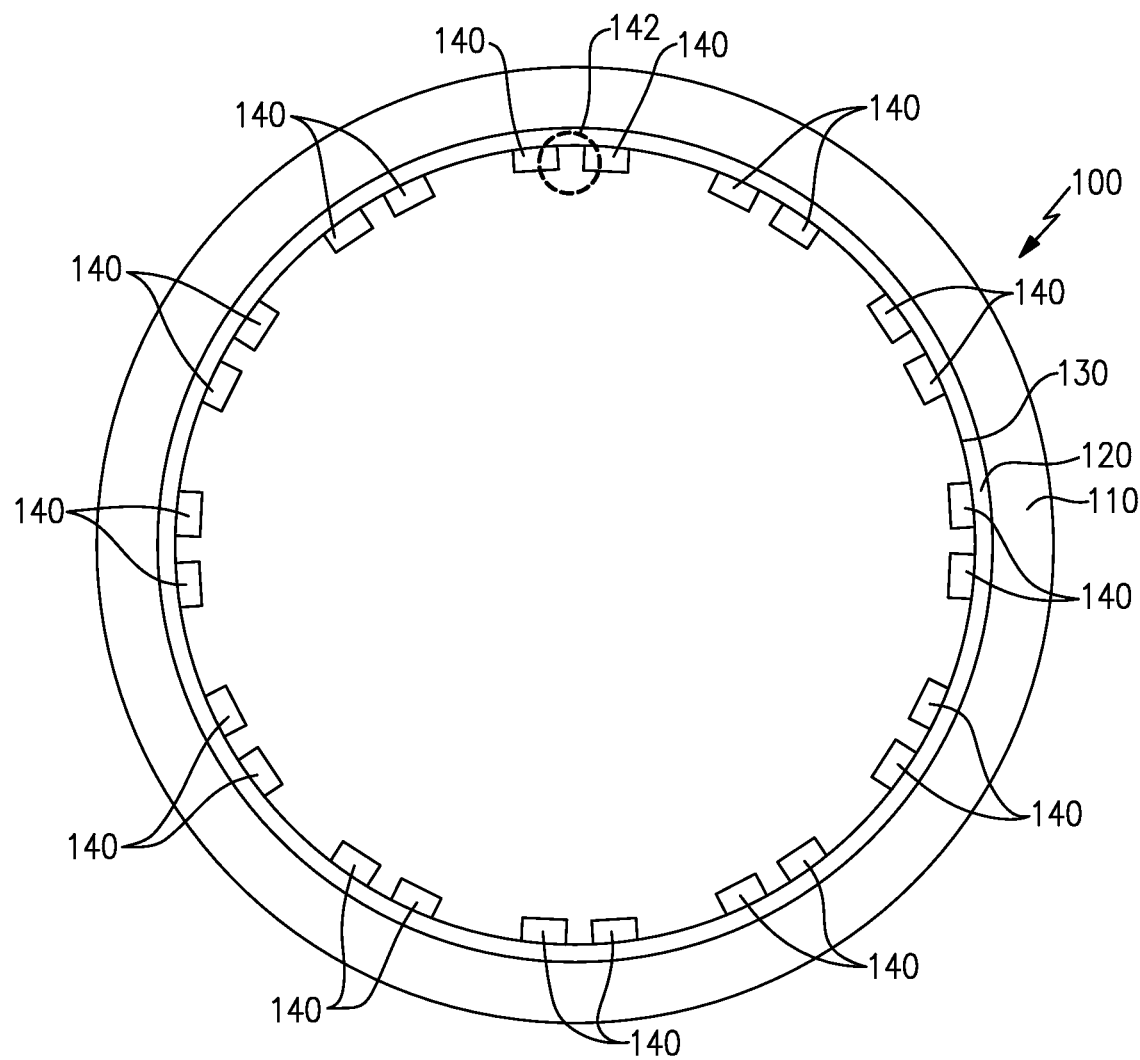
FIG. 2 schematically illustrates a rotating component for use within the gas turbine engine of FIG. 1.

FIG. 2 schematically illustrates a rotating component 100 for the gas turbine engine 20, such as a compressor rotor or a turbine rotor. The rotating component 100 includes a radially outward rotor portion 110 and a radially inward rotor portion 120. Included in the radially inward rotor portion 120 of the rotating component 100 is a balance ring flange 130. The balance ring flange 130 is shaped to receive and retain a balance ring 200 (illustrated in FIG. 3). The balance ring flange 130 further includes multiple anti-rotation connection features 140. The anti-rotation connection features 140 are grouped in pairs and distributed circumferentially about an inner diameter of the balance ring flange 130. In one example, the pairs of anti-rotation connection features 140 are distributed evenly circumferentially about the balance ring flange 130. Defined by each pair of anti-rotation connection features 140 is an anti-rotation slot 142. Each anti-rotation slot 142 is capable of receiving and retaining an anti-rotation tab of a balance ring.

In a practical implementation, the rotating component 100 is disposed about, and connected to, one of the spools 30, 32 of the turbine engine 20. The connection is via any known connection means and does not impact the inclusion of the balance ring. The spool 30, 32 in turn drives the rotating component 100 to rotate.

While the example anti-rotation connection features 140 are illustrated schematically as protruding blocks, the anti-rotation connection features 140 are, in some examples, radial intrusions into the rotating component 100. In another example, the balance ring flange 130 includes a radially intruding groove into the rotating component 100. The radially intruding groove receives a balance ring and the anti-rotation connection features 140 are further intrusions into the balance ring flange 130. In yet further examples, the anti-rotation connection features protrude axially from the rotating component 100 and the balance ring 200 connects to either a fore or aft side of the rotating component 200. In this example, the balance ring can be integrally included in a rotor cover plate.

In a practical turbine engine, such as the turbine engine 20 described with regards to FIG. 1, the rotating component 100 also includes features and aspects designed to interface with and accommodate other components of the turbine engine 20 such as stators and seals. These accommodating features cause the rotating component 100 to have a circumferentially uneven weight distribution. The uneven circumferential weight distribution is referred to as the rotating component 100 being "out-of-balance" or "unbalanced" and regions of the rotating component with excess weight are referred to as "overweight regions." The circumferential distribution of weight in an overweight region is referred to as its weight profile.

Figure 3:
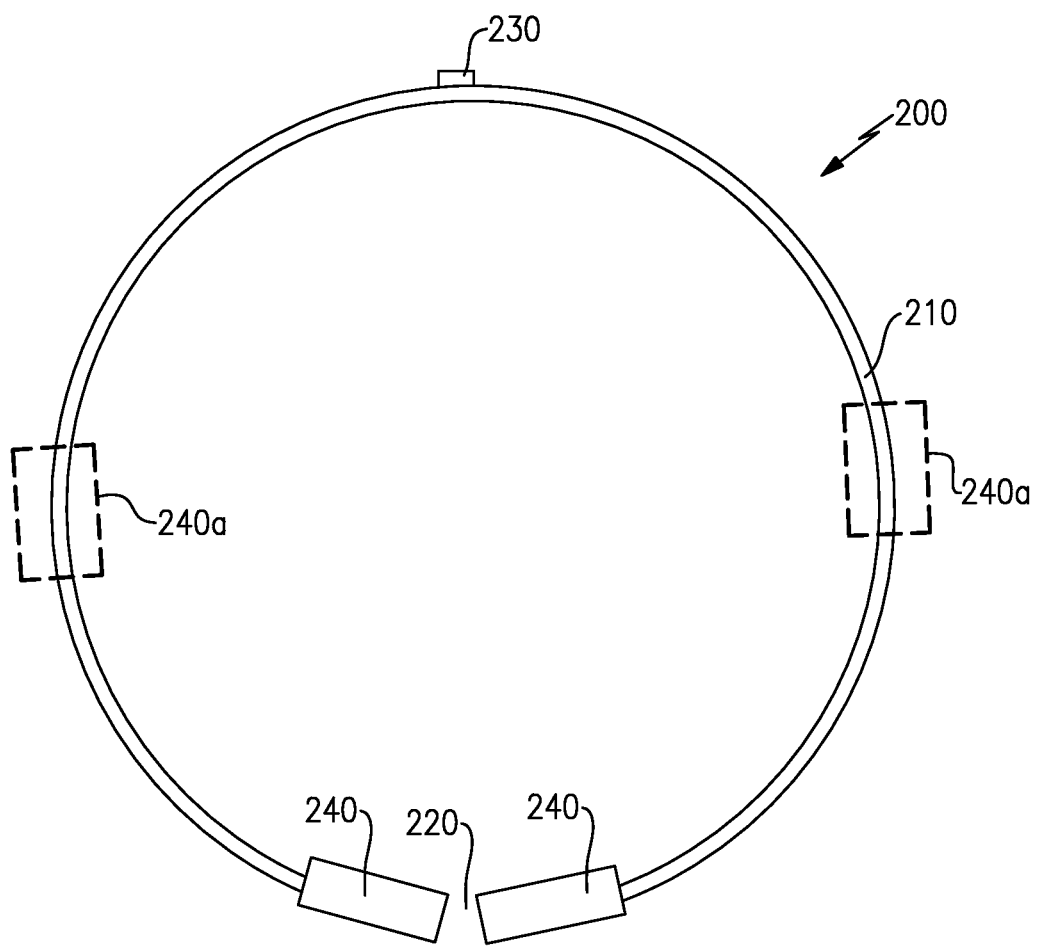
FIG. 3 schematically illustrates a balance ring for inclusion within the rotating component of FIG. 2.

While rotating, an out-of-balance rotating component 100 causes uneven stresses and wear on the rotating component 100 or on the joint between the rotating component 100 and the corresponding spool 30, 32. In order to correct for the out-of-balance rotating component 100, a balance ring 200, illustrated in FIG. 3, is positioned in or connected to the unbalanced rotating component 100. The balance ring 200 includes an intentionally unbalanced weight distribution, and the unbalanced weight distribution of the balance ring 200 counteracts the unbalanced weight distribution of the rotating component 100 resulting in an overall balanced rotating component 100.

Each engine assembly is different due to varied engine requirements and tolerances and will have a different uneven weight distribution for a given rotating component 100. Because of the varied weight distributions, stock or standard balance rings cannot always be utilized to fully balance the rotating component 100.

FIG. 3 schematically illustrates a balance ring 200 capable of being received in, and balancing, the rotating component 100 of FIG. 2. The balance ring 200 has a thin, ring-shaped body 210 that adds minimal mass to the rotating component 100. The ring-shaped body 210 includes a split opening 220. The split opening 220 allows the balance ring 200 to be connected to the rotating component 100 assembly and placed about the corresponding spool 30, 32 without requiring further machining of the rotating component 100.

Protruding radially outward from the ring-shaped body 210 of the balance ring 200 is an anti-rotation tab 230. The anti-rotation tab 230 is shaped to be received in and interface with, a corresponding anti-rotation slot 142 (illustrated in FIG. 2) in the rotating component 100. In the illustrated example, the anti-rotation tab 230 is positioned 180° offset from the split opening 220. In alternate examples, the anti-rotation tab 230 can be located at any circumferential position relative to the split opening 220. In alternate examples, the tab can be axially oriented instead of radially oriented.

The balance ring 200 further includes a pair of counterweights 240. In some examples the counterweights 240 are formed integrally with the ring-shaped body 210. In alternate examples the counterweights 240 are formed separately and connected to the ring-shaped body 210. Each of the counterweights 240 is constructed of a millable material and adds weight to the balance ring 200 in an intentionally unbalanced manner. While the illustrated counterweights 240 are immediately adjacent the split opening 220, alternate example balance rings 200 can utilize alternate counterweight locations, such as a counterweight location 240a illustrated in FIG. 3 by a dashed line.

By connecting the balance ring 200 to the rotating component 100 such that the counterweights 240 circumferentially balance an unbalanced portion of the rotating component 100, the rotating component 100 is balanced and the wear and stresses generated by unbalanced rotation are reduced or eliminated. In the illustrated balance ring 200 the counterbalancing is achieved by positioning the pair of counterweights 240 equidistant from an overweight region of the rotating component 100, creating a circumferentially symmetrical weight profile.

Figure 4:
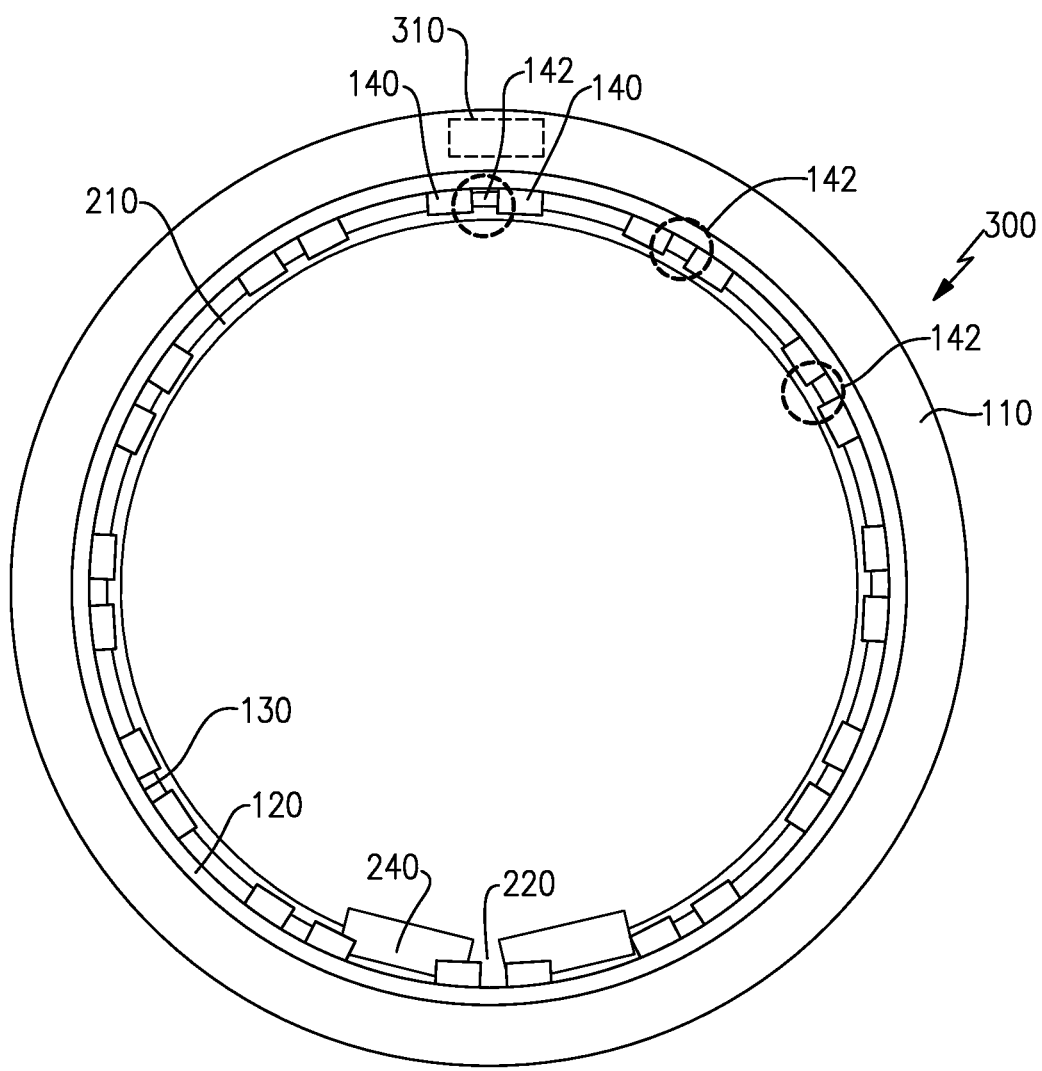
FIG. 4 schematically illustrates the rotating component of FIG. 2 and the balance ring of FIG. 3 as a single combined assembly.

FIG. 4 schematically illustrates the rotating component 100 of FIG. 2 with the balance ring 200 of FIG. 3 installed and counterbalancing an overweight region 310. The anti-rotation tab 230 of the balance ring 200 is received and retained in an anti-rotation slot 142, thereby maintaining the balance ring in a fixed position relative to the rotating component 100. In alternate examples, where the overweight region 310 is located in a different circumferential position on the rotating component 100, the anti-rotation tab 230 of the balance ring 200 is received and retained in the anti-rotation slot 142 that positions the counterweights 240 as close to equidistant from the overweight region 310 as possible. In some configurations, multiple balance rings 200 can be received by the rotating component 100 in order to balance multiple overweight regions 310.

In some alternate configurations, multiple balance rings 200 in the same circumferential orientation can be included in a single rotating component 100 when the balancing weight from a single set of counterweights 240 is insufficient.

As the anti-rotation slots 142 are positioned in discrete circumferential locations, it is not always possible for a stock balance ring 200, such as the balance ring 200 illustrated in FIG. 3, to fully counter balance the overweight region 310. Furthermore, the distribution of weight in the overweight region 310 is not necessarily circumferentially even. This weight distribution can be determined via testing the rotating component 100 and is referred to as the weight profile of the overweight region 310. As the counterweights 240 are constructed of a machinable material, the weight profile of any counterweight 240 can be adjusted via milling, or any other machining process, to allow for the counterweight 240 to properly counteract the weight profile of the overweight region 310.

Figure 5A:
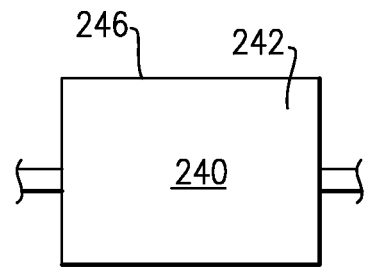
FIGS. 5A-C schematically illustrates multiple potential balance profiles of a balance ring counterweight.
Figure 5B:
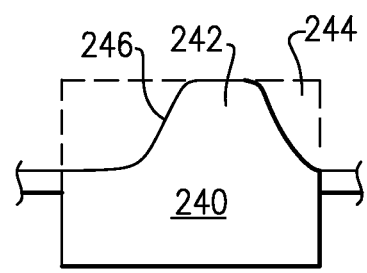
Figure 5C:
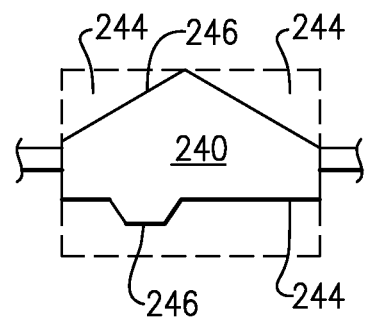

FIG. 5 schematically illustrates possible weight profiles for a counterweight 240 with FIG. 5A illustrating an initial stock weight profile of the counterweight 240, and FIGS. 5B and 5C illustrating alternate possible milled weight profiles of the counterweight 240.

The initial stock counterweight 240 of FIG. 5A has a generally uniform upper profile 246 and is constructed of a material 242 that can be milled to remove material from the counterweight 240 according to known milling techniques.

During the assembly process, the manufacturer of an engine determines the particular weight profile 246 that the counterweight 240 should have in order to properly balance the weight of the overweight region 310 of the rotating component 100 in the final engine assembly. The manufacturer then removes excess material 244 from the stock counterweight 240 via a milling process to create a shaped counterweight 240. In some examples, such as the example of FIG. 5B, material 244 is only removed from one side of the counterweight 240. In other examples, such as the example illustrated in FIG. 5C, material 244 is removed from multiple sides of the counterweight 240 to create a weight profile of the balance ring 200 that counters any unbalanced regions 310 of the rotating component 100.

Referring again to FIG. 4, multiple stock balance rings 200 can be utilized to reach a desired weight profile of the counterweights 240 when a single balance ring is of insufficient weight. In such a case, it may be necessary to mill some or all of the counterweights 240 on the stock balance rings 200 in order to achieve a desired counterweight profile.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for balancing a rotating component of a turbine engine comprising the step of:
   determining a weight profile of a rotating component of a turbine engine via empirical testing;
   adjusting a weight profile of at least one balance ring by milling at least one balance ring counterweight of the at least one balance ring to a desired weight profile, wherein the desired weight profile counteracts an overweight region of the weight profile of the rotating component; and
   connecting said balance ring to said rotating component such that said balance ring is maintained in a static position relative to said rotating component.

2. The method of claim 1, further wherein the step of connecting said balance ring to said rotating component such that said balance ring is maintained in a static position relative to said rotating component comprises receiving an anti-rotation tab of said balance ring in an anti-rotation slot of said rotating component.

3. The method of claim 2, further comprising the step of receiving a ring-shaped body of said balance ring in a balance ring retention groove of said rotating component.

4. The method of claim 1, further comprising the steps of:
   determining a weight profile of the overweight region of said rotating component; and
   determining a weight profile of the at least one balance ring counterweight operable to counter the overweight region of said rotating component based on the weight profile of the overweight region.

* * * * *